United States Patent [19]
Waggoner

[11] Patent Number: 6,019,905
[45] Date of Patent: *Feb. 1, 2000

[54] PROCESS FOR SANITIZING CHLORINATED WATER

[76] Inventor: Mark B. Waggoner, 7515 White Castle La., Plano, Tex. 75025

[ * ] Notice: This patent is subject to a terminal disclaimer.

[21] Appl. No.: 09/009,154

[22] Filed: Jan. 20, 1998

[51] Int. Cl.[7] .................................................. C02F 1/76
[52] U.S. Cl. ........................ 210/739; 210/755; 210/756; 210/764; 422/37; 433/82; 433/84; 433/98
[58] Field of Search ........................... 210/739, 754–756, 210/764; 422/37; 433/82, 84, 98

[56] References Cited

U.S. PATENT DOCUMENTS

| | | | |
|---|---|---|---|
| 3,943,261 | 3/1976 | Amon et al. | 210/754 |
| 4,647,458 | 3/1987 | Ueno et al. | 424/128 |
| 4,693,832 | 9/1987 | Hurst | 210/756 |
| 4,847,088 | 7/1989 | Blank | 424/404 |
| 5,158,454 | 10/1992 | Viebahn | 433/82 |
| 5,199,604 | 4/1993 | Palmer | 222/25 |
| 5,230,624 | 7/1993 | Wolf et al. | 433/82 |
| 5,295,829 | 3/1994 | Frey et al. | 433/82 |
| 5,360,338 | 11/1994 | Waggoner | 433/80 |
| 5,526,841 | 6/1996 | Detsch et al. | 137/15 |
| 5,709,546 | 1/1998 | Waggoner | 433/82 |
| 5,772,986 | 7/1998 | Kross | 424/53 |
| 5,785,523 | 7/1998 | Overmyer | 433/82 |

OTHER PUBLICATIONS

Anderson et al, "Effect of Disinfectants on Pseudomonades Colonized on the Interior Surface of PVC Pipes," *American Journal of Public Health*, vol. 80, No. 1, pp. 17–21.

Costerton et al, "Microbial Biofilms," *Annual Review of Microbiology*, vol. 49, 1995, pp. 711–745.

D'Aquino, M., "Lemon Juice as a Natural Biocide for Disinfecting Drinking Water," Bulletin of PAHO 28(4), 1994.

Shearer, B. G., "Biofilm and the dental office," *Journal of the American Dental Association*, vol. 127, No. 2, 1996.

Vess et al, "The colonization of solid PVC surfaces and the acquisition of resistance to germicides by water micro–organisms," *Journal of Applied Bacteriology*, vol. 74, No. 2, 1993.

Waggoner, M.B., "The New CDC Surgical Water Recommendations: Why They Should Be Implemented and What They Require," *Compendium*, vol. 17, No. 6, Jun. 1996.

Williams, J.F., et al, "Microbial Contamination of Dental Unit Waterlines: Prevalence, Intensity and Microbiological Characteristics," *The Journal of the American Dental Association*, vol. 124, No. 10, 1993.

*Primary Examiner*—Peter A. Hruskoci
*Attorney, Agent, or Firm*—William D. Jackson; Locke Liddell & Sapp LLP

[57] ABSTRACT

A method for providing an active sanitized aqueous medium in a dental treatment operation. A chlorinated water supply is treated with a physiologically-safe acidifier to provide a substantially enhanced hypochlorous acid concentration. The water is treated to convert the hypochlorite ion into the much more bacteriocidal undisassociated hypochlorous acid. A reservoir is provided at a suitable location, such as a dental treatment station. Potable water from a suitable source is supplied to the reservoir. The potable water contains free chlorine in an amount of at least 0.1 ppm. The water in the reservoir is treated with a physiologically-safe acidifier selected from the group consisting of inorganic acids, organic acids, and acid esters which have GRAS status. The acidifier is incorporated into the water within the reservoir in an amount sufficient to reduce the pH of the water to a value of about 4 or less to provide a substantially enhanced hypochlorous acid content to eliminate the viability of a mature biofilm produced by the bacteria *Pseudomonas aeruginosa*. A stream of water is delivered to a dental unit used in dental treatment from a source of potable water containing free chlorine in an amount of about 0.1 ppm or above. A physiologically-safe acidifier having GRAS status is incorporated into the water delivered to the dental unit in an amount to reduce the pH of the water delivered to the dental unit to a value of about 4 or less.

20 Claims, 3 Drawing Sheets

PROCESS FOR SANITIZING CHLORINATED WATER

FIELD OF THE INVENTION

This invention relates to methods and systems for the provision of sanitized water to medical utilization devices such as dental units and the like and treatment of the internal water contact surfaces with said sanitized water.

BACKGROUND OF THE INVENTION

The presence of pathogens in the water to be used in medical applications is naturally to be avoided whenever possible. This is especially important in so-called invasive procedures involving a surgical entry into tissues of the patient during various medical and dental treatments. One potential source of serious and sometimes even life-threatening infections can be found in instrument centers, commonly referred to as "dental units," which provide the various instruments, such as drill motors, irrigators, and the like used in dental treatments. The Center for Disease Control and Prevention (CDC) has issued recommendations in effect for the past four years which apply to water to be supplied to dental units during invasive procedures often encountered in dental treatments. (Center for Disease Control and Prevention: Recommended infection-control practices for dentistry, 1993. *MMWR* 42: No. RR-8:7, 1993.). According to B. G. Shearer in "Biofilm and the dental office," *Journal of the American Dental Association*, Vol. 127, No. 2, 1996, the American Dental Association has set forth goals for the year 2000 whereby all water delivered to dental patients will have no more than 200 colony forming units (CFU) of live bacteria per cubic milliliter. These recommendations and their application to dentistry are discussed in Waggoner, M. B., "The New CDC Surgical Water Recommendations: Why They Should Be Implemented and What They Require," *Compendium*, Vol. 17, No. 6, June 1996. As discussed there, dental water line contamination has been a longstanding problem. Various studies have shown bacterial colony-forming unit (CFU) levels in dental unit water lines ranging from 10,000 to $100 \times 10^6$ CFU per milliliter. This is due to the accumulation of bacterial colonies lining the internal dental unit tubing and the associated delivery tubing. These colonies are known as bacterial biofilms and are relatively resistant to most known biocidal agents. They act as the source for the majority of the bacterial contamination in dental unit water lines. Thus, even if sterile water, such as saline solutions and the like, are supplied to dental units, the water can become contaminated, resulting in the risk of infection to the patient.

Various procedures and treatments are known in the art for controlling various bacterial disease agents in water used for human consumption and in various medical procedures. Chlorination of domestic drinking water has controlled pathogen levels and is, of course, a well established procedure. Even with chlorination, however, a small but acceptable number of bacteria will survive. In several industries, water system design allows accumulation and growth of these few bacteria. This accumulation and growth is exacerbated if the chlorine, which is actually a gas, is allowed to escape from the water while it is not actively flowing. This chlorine loss rapidly occurs through small bore tubing made of plastic, as is commonly seen in dentistry.

Common alternative to chlorination include heavy metals like copper and silver, iodine, ultraviolet light and ozone and ozone-producing products like peroxide. One relatively unexplored approach is the utilization of high concentrations of citrus juice, such as lemon juice or citric acid as discussed in D'Aquino, M., "Lemon Juice as a Natural Biocide for Disinfecting Drinking Water," Bulletin of PAHO 28(4), 1994. Thus, D'Aquino et al discloses, the use of organic acid substances mixed with previously untreated water samples, the substances including natural lemon juice, bottled commercial lemon concentrate, and 7% citric acid solution. Different concentrations of lemon juice and the 7% citric acid solution to natural underground water levels were tested. In general, samples inoculated with the pathogen V-cholerae were not disinfected by 1% lemon juice concentrations in any dilutions resulting in a Ph of 3.9 or higher. As further disclosed by D'Aquino, higher concentrations of 10–25% lemon juice were found to disinfect the water within a period of 5–10 minutes. Lower concentrations down to a minimum of 2% were found to require at least 30 minutes to disinfect the contaminated water. Lemon juice concentrations of 1% or lower were shown to be ineffective.

Various other bactericidal agents, employing both organic and inorganic acids which are useful in forming anti-microbial formulations, are well known in the art. For example, U.S. Pat. No. 4,647,458 to Ueno et al discloses bactericidal agents incorporating mixtures of organic and inorganic acids in alcohol solutions disclosed as useful for bactericides for food stuffs and food processing machines and utensils. Disclosed in Ueno et al are various formulations incorporating organic acids such as lactic acid, acetic acid, tartaric acid, gluconic acid, citric acid, ascorbic acid, malic acid, succinic acid, fumaric acid and phytic acid in combination with various inorganic acids such as phosphoric acid, nitric acid, sulfuric acid, and hydrochloric acid. The salts of such acids also may be employed. The acid or acid salts can be employed in combination with an alcohol, such as ethyl alcohol, in aqueous solutions having a Ph of about 4 or less. U.S. Pat. No. 4,847,088 to Blank discloses an anti-microbial agent comprising a quaternary ammonium silane in combination with an organic acid such as citric acid or maleic acid or an inorganic acid such as boric acid. Various other acids disclosed for use in the Blank formulation include ascetic, adipic, anisic, benzoic, boric, butyric, capric, citraconic, cresotinic, elaidic, formic, fumaric, gallic, glutaric, glycolic, lactic, lauric, levulinic, malic, malonic, oleic, oxalic, palmitic, phthalic, propionic, pyruvic, salicylic, stearic, succinic, tannic, and tartaric acids. The Blank formulations can be used in various carriers to treat substrate surfaces such as carpet fabrics, upholstering, furniture, and the like.

Another application of bactericides is in the treatment of water, such as chlorinated city water and the like, which is applied for use in dental instruments. As discussed in the aforementioned paper by Waggoner, the bacterium *Pseudomonas aeruginosa* is commonly encountered in water supplied to dental units along with the various other microbes including *Burkholderia cepacia*, Legionella species, *Klebsiella pneumoniae*, Staphylococcus species, Streptococcus species, and *Escherichia coli*. As noted in U.S. Pat. No. 5,158,454 to Viebahn, a singular disinfection and sterilization of the water is ineffective since the infectious microbes are resupplied in the course of the dental operation from the city water or from the patient. In the Viebahn system, a strong oxidant or ozone is incorporated into water in several water reservoirs and passed from there to suitable water supply lines such as those used by a dentist or a dental assistant in the operation of the various dental instruments of a dental unit. The ozone level is maintained initially high to provide the desired disinfectant action in the water while at the same time providing an ozone level which is zero or near zero for the water at the various discharge points where the patient is contacted, such as a syringe or a drill. An ozone detector can be used to sense the ozone level when applied to various end point devices with a signal representative of ozone concentration applied to a control unit which then provides feedback signal for control of the ozone level in a ozone-producing device. Thus, the ozone level is maintained sufficiently high when supplied to one or more water reservoirs to provide for effective control of undesirable microbes and then reduced, if necessary, through the addition of ozone converters as the water is supplied to the various end point devices.

Another system desired to control the presence of infectious microbes in water supplied to dental units is disclosed is U.S. Pat. No. 5,230,624 to Wolf et al. Here, an in-line filter is provided in a supply line leading to a dental instrument, such as a drill or the like, and contains a polyiodide purification resin. The resin functions to neutralize and kill bacteria by the release of iodine from the resin surface to the bacteria through a demand release process involving electrostatic attraction. The resin is positively charged such that the negatively-charged microorganisms are attracted to the resin to the point where iodine is released directly into the microorganism.

Yet another system for delivering treated water to dental handpieces and the like is disclosed in U.S. Pat. No. 5,199,604 to Palmer. In Palmer, a plurality of solution reservoirs are connected through a valved manifold to the inlet side of a peristaltic pump which supplies suitable handpieces, such as an irrigator, for treatment of periodontal disease. By way of example, the various reservoirs may contain colored-coded solutions, such an orange color for a bacteriostatic rinse solution and another color for a hydrogen peroxide solution and various other colors for additional solutions used for irrigation purposes. The peristaltic pump can be employed to deliver the particular irrigating solution selected at a substantially constant pressure and a substantially constant flow rate.

Methods utilized to eliminate bacterial biofilms in industry include steam purging and hyperchlorination "shock treatments." In dentistry, hyperchlorination "shock treatments" have been used, but the "shock treatments" must be repeated every week because the biofilm begins to regrow in that period of time. This type of system also requires use of only sterile water to slow down the biofilm formation. According to J. F. Williams, et al, in "Microbial Contamination of Dental Unit Waterlines: Prevalence, Intensity and Microbiological Characteristics," *The Journal of the American Dental Association*, Vol. 124, No. 10, 1993, mature biofilms are notoriously resistant to chemical disinfection including these "shock treatments." Thus, if a practitioner does not treat his system for several weeks, the biofilm will become resistant to this method. According to Vess et al in "The colonization of solid PVC surfaces and the acquisition of resistance to germicides by water micro-organisms," *Journal of Applied Bacteriology*, Vol. 74, No. 2, 1993, most biocidal agents have not been shown to destroy a mature biofilm.

SUMMARY OF THE INVENTION

In accordance with the present invention there is provided a process for supplying an active sanitized aqueous medium in a dental treatment operation. The invention involves the use of a chlorinated water supply which is treated with a physiologically-safe acidifier to provide a substantially enhanced hypochlorous acid concentration. That is, the water is treated to convert the hypochlorite ion into the much more bacteriocidal undisassociated hypochlorous acid. In carrying out the invention, there is provided a reservoir at a suitable location, such as a dental treatment station. Potable water from a suitable source is supplied to the reservoir. The potable water contains free chlorine in an amount of at least 0.1 ppm and preferably an amount of at least 0.3 ppm. The water in the reservoir is treated with a physiologically-safe acidifier selected from the group consisting of inorganic acids, organic acids, and acid esters which have GRAS status. The acidifier is incorporated into the water within the reservoir in an amount sufficient to reduce the Ph of the water to a value of about 4 or less to provide a substantially enhanced hypochlorous acid content to eliminate the viability of a mature biofilm produced by the bacteria *Pseudomonas aeruginosa*. The water within the reservoir is then withdrawn from the reservoir, preferably on a daily basis and newly mixed water and acid are added. The water should be used within 24 hours after treatment with the acidifier. Preferably, the water is used within 16 hours subsequent to addition of the acidifier and more preferably within about eight hours subsequent to treatment of the water. In a further aspect of the invention, stale water is removed from the reservoir, and a new supply of water having a free chlorine content as indicated is treated as described above.

In a further aspect of the invention, there is provided a dental unit for use in dental treatment. A stream of water is delivered to the dental unit from a source of potable water containing free chlorine in an amount of about 0.1 ppm or above. A physiologically-safe acidifier, selected from the group consisting of inorganic acids, organic acids, and acid esters having GRAS status described above, is supplied. The acidifier is incorporated into the water delivered to the dental unit in an amount to reduce the Ph of the water delivered to the dental unit to a value of about 4 or less providing an enhanced hypochlorous acid content sufficient to eliminate the viability of a mature biofilm produced by the bacteria, *Pseudomonas aeruginosa*.

A preferred application of the present invention is in the treatment of potable chlorinated water having a hardness of about 100 ppm or more measured as calcium carbonate. At a water hardness of about 100–200 ppm measured as calcium carbonate, the pH should be reduced to a value of about 3.1 or less. The water may have a substantially higher hardness, ranging up to about 500 ppm calcium carbonate or more and still be effectively treated. In this case the pH of the acidifier preferably is added in an amount to reduce the pH to a value of about 2.8–2.9 or less.

In a further aspect of the invention, the flow rate of water delivered to the dental unit is varied as in the course of normal dental treatments. The flow rate of the water as it is supplied to the dental unit is sensed, and the rate at which the acidifier is incorporated into the water is adjusted in response to the sensed flow rate.

In a further preferred embodiment of the invention the acidifier employed is selected from the group consisting of lactic acid, acetic acid, benzoic acid, parahydroxybenzoic acid ester, ascorbic acid, isoascorbic acid, citric acid, sorbic acid, formic acid, phosphoric acid, hydrochloric acid, boric acid, malic acid, tartaric acid, succinic acid, and glutaric acid. An especially suitable acidifier for use in hard water is citric acid.

DETAILED DESCRIPTION OF THE INVENTION

Figure 1:
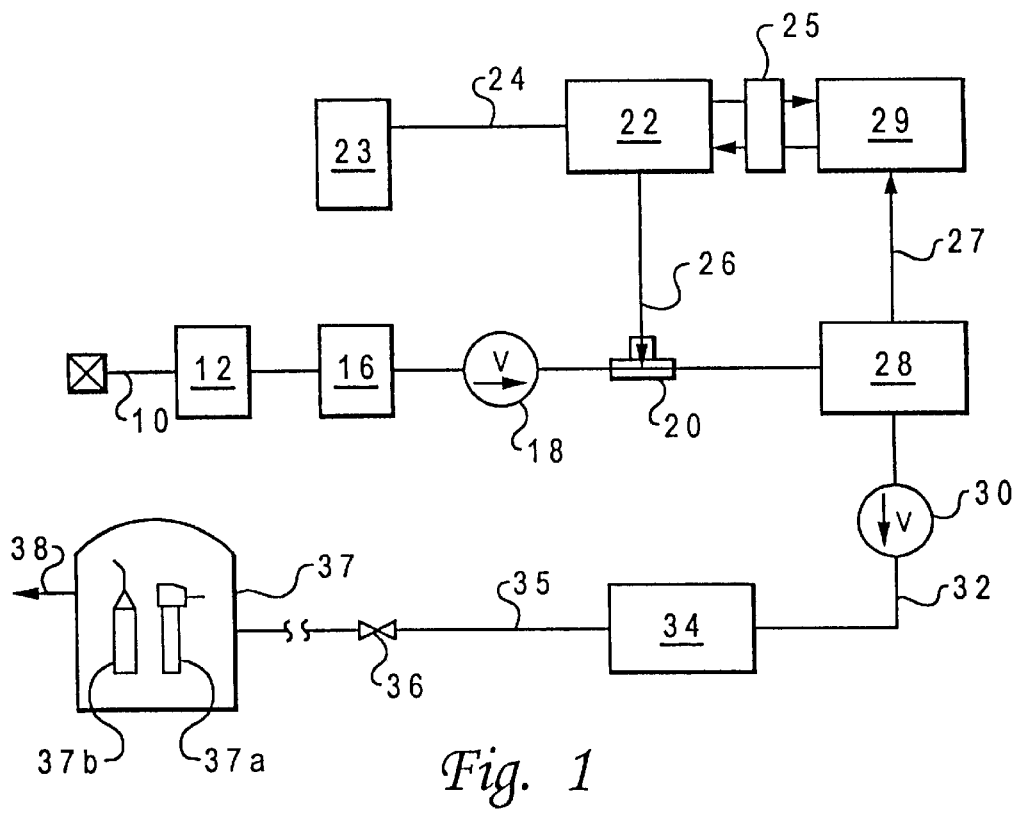
FIG. 1 is a schematic illustration of a system which may be used in carrying out the present invention.

The present invention provides for the treatment of chlorinated water in reservoirs or which is flowing in water supply lines in a manner to reduce bacterial contamination to a level suitable for human interaction when performing standard dental procedures and the like. In the present invention an acidifier is supplied to chlorinated water in an amount sufficient to reduce the pH to a level to enhance the formation of hypochlorous acid as an effective bactericide. The acidifier can be continuously supplied to a water supply system, such as in a dental unit water line, in a concentration which is acceptable to provide for potable and palatable water, while at the same time eliminating the formation of biofilm by bacteria which are commonly encountered in water sources such as municipal water and bacteria from human sources. As discussed in the aforementioned paper by Waggoner, bacterial contamination in dental unit water lines has been a long recognized problem. CFU levels up to $10 \times 10^6$ ml have been observed. The contamination can stem from municipal water sources or other water supplied to the system or, in the case of dentistry, from the patient because of backflow of patient materials into the dental handpiece which can occur under a number of circumstances.

Chronic contamination of dental unit water lines and the like is due to the buildup of a slime layer, commonly referred to as a bacterial biofilm, resulting most commonly from gram-negative bacteria typically found in municipal water sources. The biofilm itself, and not the municipal water, is the major source of bacterial contamination. The biofilm is a colonial aggregation of various bacteria which are bound together by proteinatious deposits called glycocalyx. These multiple layered bacterial colonies act to protect each other from chemical disinfectants and bacterial predators like protozoa. Thus, surface bacteria may die from a disinfectant treatment but the deeper layers of bacteria survive. These bacterial biofilm colonies are constantly added to by bacteria found in the municipal water supply as well as patient material sucked back into the system.

This invention proceeds in a manner contrary to these various prior art procedures discussed above. Rather than attempting to suppress bacterial contamination through strong disinfectants or antioxidants or by periodic use application of bactericides to shock the system, the present invention involves the use of an acidifier which is supplied to a free chlorine-containing water stream in a more or less continuous fashion and at a low concentration which is not likely to cause damage to soft tissue or otherwise be harmful to a patient. The present invention enables the use of acidifiers, such as carboxylic acids, hydroxycarboxylic acids, or inorganic acids such as hydrochloric acid or phosphoric acid in low concentrations which are consistent with water to be used in dental or hospital applications or in various regulated products, such as cosmetics, pharmaceuticals, and the like, intended for human consumption or application to tissues.

As noted previously, mature biofilms are established bacterial colonies which are much more difficult to treat than water-born free bacteria. For example, as disclosed in the aforementioned paper by Vess et al, bactericides such as free chlorine in a concentration of only a few parts per million are well-known bactericides which readily kill water-born bacteria. However, such bactericides are recognized to be ineffective in killing mature biofilms. Mature biofilms can generally be characterized as relatively thick colonies of bacterial cells and extracellular material which usually have thicknesses within the range of about 20–60 microns and more particularly within the range of about 30–50 microns. Such mature biofilms and their characteristic resistance to bactericidal attack are discussed in the aforementioned papers by Vess et al and Williams et al and also in papers by Anderson et al, "Effect of Disinfectants on Pseudomonades Colonized on the Interior Surface of PVC Pipes," *American Journal of Public Health*, Vol. 80, No. 1, pp. 17–21, and Costerton et al, "Microbial Biofilms," *Annual Review of Microbiology*, Vol. 49, 1995, pp. 711–745. For example, the paper by Anderson et al, in addressing research on mature biofilms resulting from colonies of *Pseudomonas aeruginosa* and *Pseudomonas pickettii*, discusses the survival of biofilm colonies in the presence of various disinfectants ranging from alcohols and aldehydes to quaternary ammonium compounds and halogen-based antiseptics. The paper by Costerton et al characterizes mature biofilms as matrix-enclosed bacterial populations which are adherent to each other and/or to surfaces or interfaces. During active growth, these biofilm colonies will slough off surface layers which will then contaminate the water supply and can then attach to and grow on uncontaminated locations. They are described in Costerton et al as being characterized by the production of extensive networks of bacterial cells linked to each other by highly hydrated exopolysaccharides which are characterized as having substantially enhanced resistance to antimicrobial agents. As discussed in Costerton et al, biofilms cells can be characterized as being at least 500 times more resistant to antibacterial agents than free planktonic cells. For a further description of mature biofilms and their characteristics, reference is made to the aforementioned papers by Anderson et al, Vess et al, Williams et al, and Costerton et al, the entire disclosures of which are incorporated herein by reference.

Thus, to the extent a mature biofilm in a system, such as a water delivery system to a dental patient, can function as an ever replenishing reservoir of bacteria, the present invention attacks not only the water-born bacteria but, more importantly, the biofilm bacteria. It can be stated, as a general observation, that the ratio of biofilm bacteria to free water-born bacteria is more than 10:1. In many water delivery systems, the residence time of the water as it flows through the system may range from only a few seconds up to about one minute. If one employs the conventional approach of intermittently producing an antiseptic environment in a water delivery system, there will remain the potential for regrowth and replenishment of bacteria by the remaining biofilm bacteria because of their resistance to most biocides, resulting in an unacceptably high bacterial count in the water delivered to the patient. By eliminating the mature biofilm through a constant supply of an effective potable biocide, this major source of contamination is eliminated. By increasing the contact time of the biocide through. the use of a mixing chamber, newly introduced water-born and patient-originated bacteria are greatly reduced in number or eliminated depending upon the contact time.

The present invention provides a process by which mature biofilms, including biofilms of the type produced by gram negative bacteria such as *Pseudomonas aeruginosa*, are reduced to the point of elimination of viability through the use of an acidifier, preferably a hydroxycarboxylic acid in relatively low concentrations so as not to be harmful to human tissue, to provide an environment favoring the formation of hypochlorous acid in chlorinated water. Hypochlorous acid and the corresponding monovalent and divalent metal salts, such as sodium hypochlorite and calcium hypochlorite, are effective bactericides and can be used in various water systems to take advantage of their biocidal characteristics. For example, calcium hypochlorite can be employed in tablet form as a disinfectant for water such as in swimming pools and the like. Hypochlorous acid is formed by the chlorination of water. Hypochlorous acid is a relatively weak acid exhibiting a $pK_a$ of 7.53. Thus, in municipal water systems which are near neutral in pH, one-half of the chlorine is present as a hypochlorous acid. The result is a relatively stable system which remains chlorinated for prolonged periods of time. Since hypochlorous acid decomposes to hydrochloric acid and molecular oxygen, as the equilibrium relationship between hypochlorous acid and the hypochlorite ion is shifted in favor of hypochlorous acid, depletion of free chlorine is accelerated with the result that ultimately no free chlorine would be left in the water system. Thus, having a solution where the pH is equal to or near the relatively high $pK_a$ of hypochlorous acid works in favor of maintaining a relatively stable system at near neutral pH's of about 7. As will be discussed in greater detail below, preferred acidifiers for use in the present invention are a group consisting of the GRAS substances: lactic acid, acetic acid, benzoic acid, parahydroxybenzoic acid ester, ascorbic acid, isoascorbic acid, citric acid, sorbic acid, formic acid, phosphoric acid, hydrochloric acid, malic acid, tartaric acid, succinic acid, and glutaric acid. Especially preferred are the hydroxycarboxylic acids, such as malic, tartaric, citric, ascorbic, and isoascorbic acids. This is because of their acceptable flavor, wide margin of safety, chelating ability, and their general lack of waterline material damage. Citric acid is particularly preferred because of its availability, low cost, and confirmed general safety. As indicated by the experimental data presented hereinafter, citric acid at a low concentration, e.g. about 0.2 wt. %, withh a pH of less than 4 and more ideally around 2.8–2.9, when added to chlorinated hard water is effective not only in preventing the formation of biofilms, but in actually eliminating the viability of mature biofilms. It is also, at this same low concentration, capable of providing an environment which rapidly kills both water and human-originated pathogenic bacteria. Hydrochloric acid was also shown to accomplish the same endpoint kill at an equal pH level. While not required, much higher concentrations can be used without harmful side effects.

While, as indicated by the experimental work described later, the present invention is effective in the elimination of the viability of the mature biofilms commonly encountered in water supply systems regardless of their bacterial genesis, the bacterium *Pseudomonas aeruginosa* is a highly ubiquitous bacterium, and this species will be used in broadly describing the invention and as the standard for determining the activity of the preferred hydroxycarboxylic acid acidifier. In carrying out the invention, free chlorine-containing water supplied to a dental patient is treated with a hydroxycarboxylic acid as an acidifier in an amount sufficient to eliminate a mature biofilm produced by *Pseudomonas aeruginosa* bacteria. By using *Pseudomonas aeruginosa* as the standard for treatment, effective biofilm elimination can be achieved regardless of the particular bacterial species involved. The viability of the mature biofilm can be eliminated to the point where the predominant bacteria content in the water is free water-born bacteria as contrasted with biofilm bacteria. Stated otherwise, the replenishment mechanism noted above is interdicted so that the bacterial content, if any, is mostly free bacteria.

As described in greater detail below, two modes of operation may be followed in carrying out the present invention. An in-line, air-pressurized water reservoir, such as a 0.5–2 liter container which is plumbed into the dental unit and acts as a water supply, is filled with chlorinated water and treated with acidifier to achieve the desired pH to favor of the formation of hypochlorous acid. Such reservoirs are in themselves well known in the art and may be of any suitable type. For example, the System 6000 postmounted utility center, available from DCI International, Newberg, Oreg., incorporates a self-contained water system in which either city water or bottled water can be selected. Self-contained water systems, such as are available from American Dental Accessories, Minneapolis, Minn., including a regulator and an on-off air toggle for the reservoir, are also suitable for use in this aspect of this invention. In another mode of operation, a water sanitizing system of the type disclosed in U.S. patent application Ser. No. 08/755,573, filed Nov. 27, 1996, by Mark B. Waggoner, and issued on Jan. 20, 1998, as U.S. Pat. No. 5,709,546, can be employed to add acidifier in an amount to reduce the pH to a level at which to form an effective amount of hypochlorous acid to eliminate the viability of a mature biofilm produced by the bacteria *Pseudomonas aeruginosa*.

In terms of the pH of the free chlorine containing water, sufficient acidifier, whether a hydroxycarboxylic acid such as citric acid, a monocarboxylic acid, or an inorganic acid such as hydrochloric acid, should be added to bring the pH level value to about 4 or less. At this pH level the hypochlorous acid can be expected to be near 100% associated. However, as indicated by the foregoing experimental work, the acid salt associated with the presence of divalent metal ions has an adverse impact on the bacteriocidal action of the hypochlorous action. Stated otherwise, as the water hardness increases, the amount of acidifier added with the attendant reduction in pH will be increased.

Effective results can be achieved with a free chlorine content as low as 0.1 ppm. Free chlorine should be present in the water to provide a chlorine source for the hypochlorous acid. Typically, a municipal water supply might be expected to have an initial free chlorine content of perhaps 2.5 ppm at the source. However, as the water flows through the distribution system, chlorine is lost, so at the end point the chlorine level typically might be in the range of 0.4 to 0.5 ppm. Very good results can be achieved at this chlorine level although free chlorine is about 0.9 ppm chlorine.

While the invention will be described below with a preferred hydroxycarboxylic acid, citric acid, and an inorganic acid, hydrochloric acid, other acidifiers, which can be used to bring down to the desired level the pH of the chlorine containing water, can be used in carrying out the present invention. The acidifiers used in carrying out the present invention should be recognized as having GRAS status. GRAS substances are designated by the Food and Drug Administration (FDA), United States Department of Health, Education, and Welfare, as generally recognized as safe in accordance with 21 CFR 170.3 and 170.30. Such acids or acidifiers can include monocarboxylic acids, dicarboxylic acids, hydroxycarboxylic acids, inorganic acids, and acid esters such as the parabens which are in themselves known to be effective antimicrobial agents for food and pharmaceutical products. Suitable organic acidifiers which can be used in carrying out the invention include formic acid, acetic acid, propionic acid, benzoic acid, maleic acid, esters of parahydroxybenzoic acid such as the methyl, ethyl, propyl, and butyl parabens, glycolic acid, lactic acid, malic acid, tartaric acid, and citric acid, as mentioned previously. Inorganic acids which may be used in carrying the present invention include hydrochloric acid, as mentioned previously, and phosphoric acid.

As indicated previously, the various acids having GRAS status can have a direct effect as a biocidal agent in the present invention. The acidifying agents are used to effect an acidification of chlorinated water, such as chlorinated municipal water, to bias the equilibrium relationship between hypochlorous acid and the hypochlorite ion to favor hypochlorous acid. Hypochlorous acid is much more effective as a bactericide than the hypochlorite ion. Hypochlorous acid has a disassociation constant PK of 7.53. Thus, in a weak solution of the acid at a pH of 7.53, the ratio of the undisassociated hypochlorous acid to the hypochlorite anion is unity (1:1). As the pH is decreased, the concentration of the bactericidally-effective undisassociated hypochlorous acid is increased at the expense of the relatively impotent hypochlorite ion. In the present invention a sufficient acidifier is incorporated into the water supply to reduce the pH to a level which will enhance the hypochlorous acid content of the water sufficient to eliminate the viability of a mature biofilm produced by the bacteria *Pseudomonas aeruginosa*. The pH is reduced sufficiently so that the equilibrium is shifted in favor of at least 98–99% hypochlorous acid, or stated otherwise, the ratio of hypochlorous acid to hypochlorite ion is at least 50:1.

As described in greater detail below, the desired pH will depend upon the hardness of the water. Most municipal water supplies have a hardness measured in terms of parts per million of calcium carbonate with the range of 50–250 ppm calcium carbonate. Typically, a hardness of about 100 ppm calcium carbonate can be expected. In this case, it will be preferred to reduce the pH to a value of about 3.2 or less. Where greater amounts of divalent metal ions are present, the pH should be lowered still further. As indicated by experimental work presented hereinafter, pH levels of about 2.8–2.9 have been found to be effective in the elimination of viable biofilms in dental treatments in very hard water. The pH will seldom be reduced to below 2.4.

Turning now to FIG. 1, there is illustrated a schematic illustration of one system of the type disclosed in U.S. Pat. No. 5,709,546 for use in carrying out the present invention. The embodiment in FIG. 1 is specifically adapted for the supply of water to a dental unit which may be of any type, such as will be well known to those skilled in the art. Referring further to FIG. 1, there is illustrated a water supply line 10 which is adapted to be connected to any suitable source of water. For example, supply line 10 may be connected to a tap for the supply of city water, or it may be connected to a special source of chlorinated water. The line 10 preferably is provided with a relatively fine filter 12 to filter out suspended sediments. Preferably, the water filter is at least a 50 micron filter, i.e. one that functions to filter out particulates having an average particle size of 50 microns or more. In a preferred application of the invention for use in dental units, the filter may take the form of a 25 micron filter, that is, a filter permitting the passage only of particulates of a size of 25 microns or smaller.

In the case where municipal water and the like is involved, the water supply line is provided with a pressure reducing valve 16 which functions to reduce the line pressure to a desired value. For example, municipal water supplies typically involve line pressures ranging from about 45 to 100 psi (absolute), whereas if, as is preferred, a peristaltic pump is employed to incorporate bactericide into the water, it is desirable to provide a substantially lower pressure in order to provide for efficient operation of the pump. In this case, the pressure-reducing valve will function to reduce the line pressure to about 18 to 22 psia.

The output from the pressure-reducing valve is applied through a check valve 18 to a mixing junction 20 which provides for the incorporation of the citric acid or other acidifiers into the water supply line. A variable rate pump 22 is connected through a pump inlet line 24 to a reservoir 23 which contains a suitable acidifying solution, for example a 15 wt. % aqueous solution of citric acid. Calcium saccharin or sodium saccharin can be added in a 1 wt. % quantity to the citric acid solution to make the final delivered water mixture more palatable if the application is dental or other similar use. An outlet line 26 from the pump provides a bactericide supply line to the mixing junction 20.

A flow sensing unit 28 is incorporated into the water supply line. Sensing unit 28 may incorporate a flow meter of any suitable type which generates an output signal representative of the sensed flow rate. The flow sensor produces an output signal which is applied via channel 27 to a microprocessor 29 which controls the speed or the volumetric pumping rate of the pump 22 by means of a control circuit 25. Preferably, the flow sensing unit 28 is located downstream of the mixing junction as shown. By locating the sensing unit here, rather than at a point in the supply line prior to the supply of the acidifier, the tendency of biofilm production in the flow sensing unit will be alleviated. This is because the bactericidal environment will also prevent biofilm formation on the flow sensor or flow switches. As described later, the sensing unit preferably will take the form of two or more incremental "flow switches." Preferably, these flow switches will be formed of 316 grade stainless steel or FDA grade plastic or any other suitable material which is not adversely affected by the presence of a relatively concentrated citric acid solution. A check valve 30 is located in the water supply line downstream of the flow sensor, and it likewise should be formed of a material such as is not adversely affected by a high citric acid environment. By way of example, the fittings for the sensor and the check valve could be formed of nylon or polypropylene. The check valve can take the form of a polypropylene ball having a crack pressure of ½ psi and biased to the closed position by a high grade stainless steel spring.

The fluid output from the sensing unit 28 is applied via check valve 30 and line 32 to an enlarged mixing chamber 34. The mixing chamber 34 functions to ensure a properly mixed treated water supply and to allow a volume of water to be treated over time to allow the acidifier to produce the lowered pH in favoring the formation of hypochlorous prior to being delivered. An outlet line 35 from the mixing chamber 34 extends to a suitable fitting 36 which is adapted to be connected to an endpoint utilization device. In a preferred application of the invention, as described below, the outlet line 35 is connected to a dental unit 37 which may be equipped with any suitable utensils for use in dentistry. Suitable dental appliances which may be employed in conjunction with the dental unit include drill turbines, drill motors, air/water syringes, irrigators, sonic and ultrasonic scalers, endodontic ultrasonic and sonic filers, etc. The dental unit 37 comprises one or more water delivery lines to which the dental appliances can be releasably connected. Water will be supplied to the various dental appliances at rates which can vary substantially from one appliance to the next. In the embodiment of FIG. 1, the dental unit 37 is shown schematically to incorporate a drill unit 37a and a syringe 37b. These hand pieces can be attached to the end of a water delivery line 38 by means well known to those skilled in the art. For a further discussion of dental units of the type which may employed in carrying out the present invention, reference is made to U.S. Pat. No. 5,360,338 to. Waggoner and also the aforementioned U.S. Pat. No. 5,158, 454 to Viebahn et al., the entire disclosures of which are incorporated herein by reference. The flow sensing unit can be of any suitable type which functions to produce either an analog or digital output signal representative of flow rate through the line. The sensing unit could also comprise a plurality of series connected flow-measuring devices which can have a variable signal output in relation to the measured flow rate, an incremental output in response to the flow rate reaching a designated level or a combination of such flow-measuring units, for example, having one incremental output and the other a variable output. One of these two types can be used in conjunction with a peristaltic pump which is operated by a variable speed DC motor.

Figure 2:
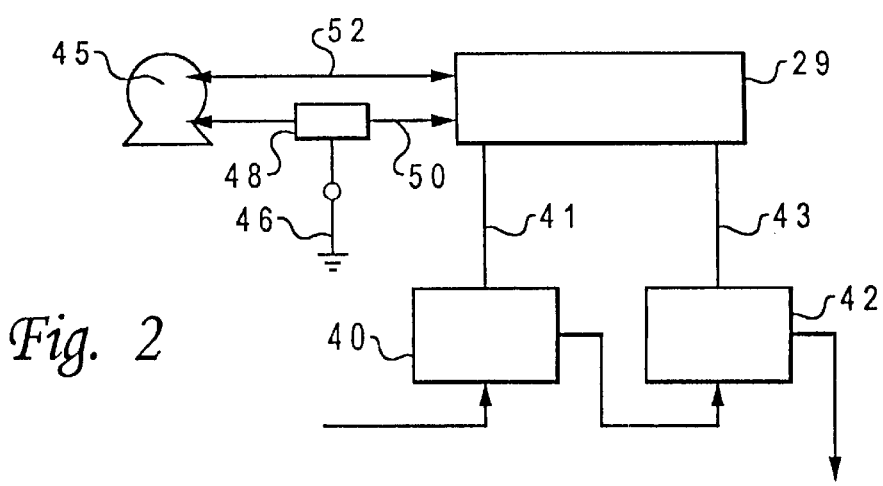
FIG. 2 is a schematic illustration of a system for use with the invention incorporating sequential flow switches in order to monitor flow rate.

A system incorporating sequential flow measuring devices is illustrated in FIG. 2. Here, the flow sensing unit comprises a plurality of incremental flow switches operating at different flow rates. For example, in the embodiment illustrated in FIG. 2, two flow switches indicated by reference numerals 40 and 42 are involved—one operating at a flow rate of 3 ml per minute and the other operating at a flow rate of 24 ml per minute. Thus, the flow switches 40 and 42 may each take the form of an adjustable flow monitor available from Chem. Tec under the model designated 125BP. These flow switches, which are made of stainless steel, are characterized by a magnetic piston which is forced into proximity to a reed switch to actuate the switch at a given flow rate. When the flow rate falls below the designated set point, the piston moves out of proximity and the switch is deactivated. The microprocessor 29 operates to vary the pump speed and therefor the pumping rate in response to the output from the flow switches 40 and 42. Thus, by way of example, the pump motor 45 is energized from a 12-volt DC source 46 through a pump motor controller 48 which controls the voltage applied to the motor, and thus the motor speed. For example, at a first flow rate of 3 ml per minute, switch 40 is actuated to send a signal via channel 41 to microprocessor 29. The microprocessor responds to generate a command signal via channel 50 to apply a low voltage, e.g. 1.4 VDC, to operate the motor of the variable speed peristaltic pump to provide a pump rate of 0.2 ml of bactericide solution. When the flow rate reaches 24 ml per minute, switch 42 is activated, sending a signal via channel 43 to the microprocessor 29. The microprocessor responds by sending a signal to motor control unit 48 to step up the voltage to increase the pump speed to pump 1.2 ml per minute of bactericide to the flow line at the mixing junction. A signal, representative of the speed of the pump, is applied via channel 52 to the microprocessor 29 so that the feedback control is provided to maintain the pump at the designated speed. The feedback control may be accomplished by any suitable means, such as a magnetic pickup or a photoelectric cell used to measure pump speed. For example, a slotted disk may be mounted on the shaft of the pump and located between an electro-optic transducer and a source of light so that the transducer output produces a signal directly representative of the speed of the pump. This signal is processed by the microprocessor and any adjustments made as necessary to vary the voltage to the voltage variable motor of the peristaltic pump to ensure that the pump runs at the proper speed associated with the outputs from the flow switches.

As indicated previously, variable output sensing units can be employed. One or both of the flow switches 40 and 42 may be replaced by a sensing unit operating over a designated range to provide a variable output signal. Where one of the flow monitors operates to produce a variable output proportional to flow rate, it usually will be preferred to employ this unit in place of flow switch 42 to sense a variable flow rate over a relatively high range; for example, a range of 10–20 milliliters per minute. Preferably the control system is integrated so that the higher flow-rate monitor having a variable output functions only after the control system receives the incremental signal function representative of the flow rate at a designated lower range. The signal appearing at channel 52 may also be employed to provide a fail-safe feature which shuts down the pump in the event the pump operates for more than a designated time period. For example, the microprocessor can be provided with an internal clock which is driven to a time-out function in response to a signal appearing continuously on channel 52 indicating uninterrupted operation of the pump. Should this signal be present for a period which would be beyond the operating time expected during normal operation, e.g. one hour, the clock function will act to apply a signal via channel 50 to open the circuit to voltage source 46 and thereby shut down the motor. This also activates an alarm such as a buzzer or other audio or visual signal generators which would act to alert the operator. The system cannot thereafter be restarted without the application of an external reset signal. For example, the microprocessor may be programmed so that it cannot be restarted until power is completely removed from the unit and thereafter applied. For example, where the system voltage is supplied by a 12-volt transformer connected to a 120 or 220 AC voltage source, as is commonly employed for office use, the system may be reset by simply unplugging the transformer.

From the foregoing description, it will be recognized that the present invention is directed not only to sanitizing the supplied water but, more importantly, to destroying or preventing the formation of bacterial biofilm on surfaces within the water supply unit. By maintaining continuously an atmosphere which is antagonistic to the formation of the biofilm, the overall bacterial contamination within the water can be kept at an acceptably low level. Thus, the invention departs from the normal prior art approach to bacterial contamination in that it is aimed not so much at destroying bacteria within the water, but instead at eliminating the viability of the biofilm from which bacteria may emanate. This important feature of the invention enables the water to have a very low level of bacteria through the use of relatively mild antibacterial systems which are not irritant to or destructive to tissue and which can be tolerated, if necessary, under conditions involving relatively long exposures and can be consumed, if necessary, without harm.

Although only two flow switches are illustrated in the embodiment of FIG. 2, it will be recognized that three or more flow switches can be provided in the event it is desired to exercise closer control of the pump speed in relation to the amount of bactericide introduced into the supply line in response to the water supply flow rate. For example, three switches could be employed, set to produce output signals at two ml per minute, 16 millimeters per minute, and 50 ml per minute. In either case, the peristaltic pump can be driven by a 12-volt DC variable speed motor with the motor RPM's directly proportional to the voltage amplitude supplied to the motor.

Also while an incremental mode of operation is provided by two or more constant flow switches having incremental set points is preferred, it is to be recognized that an analog control scheme can be employed. For example, rather than step-wise operation of the pump motor, the flow rate can be continuously monitored to a relatively close tolerance and the motor speed varied to maintain the concentration of the citric acid or other acidifier at a relatively constant level within the water supply line. This application is useful where large water volume variations are required or closer tolerances are necessary. In a dental application, either system could be utilized.

Figure 3:
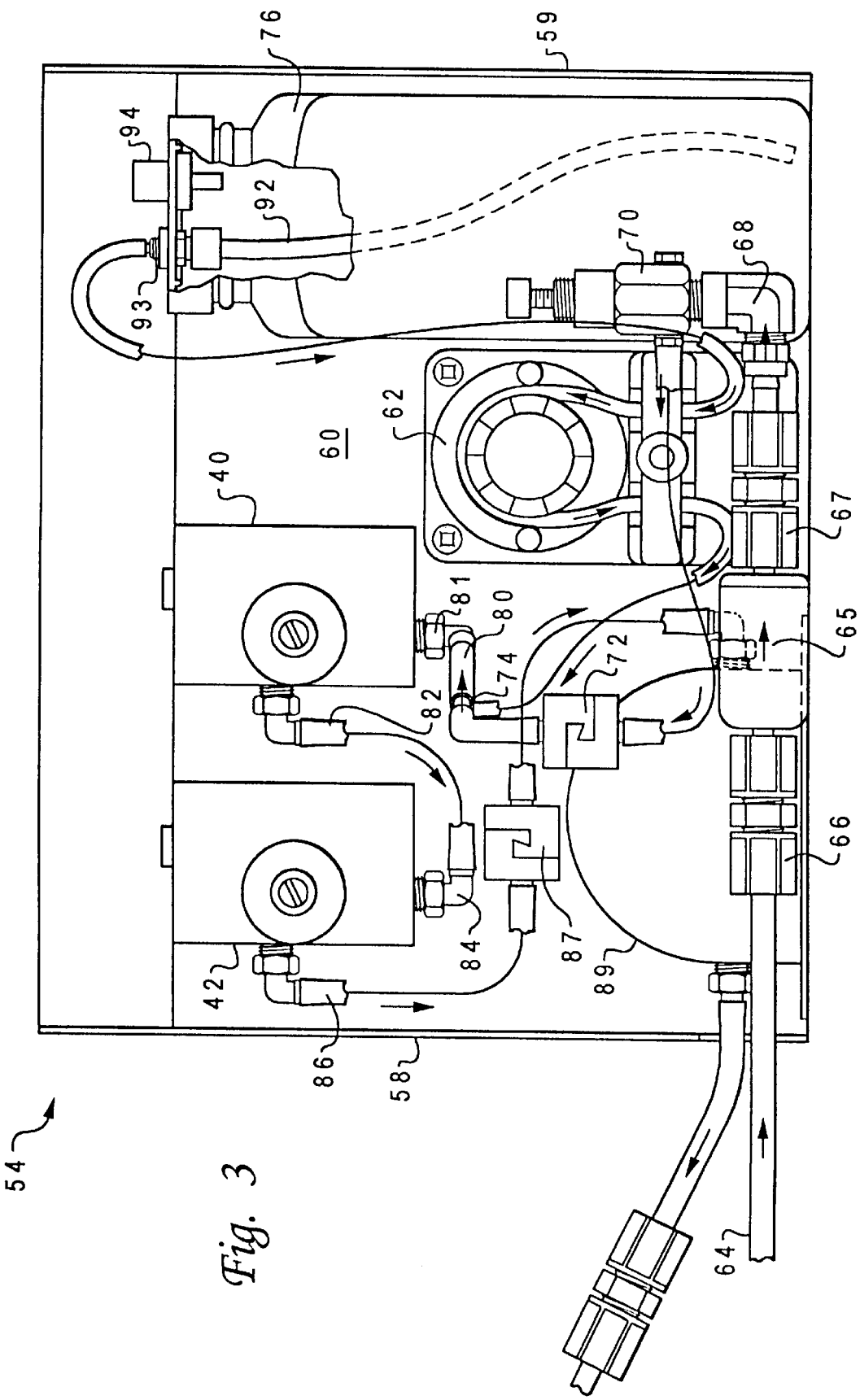
FIG. 3 is a side elevation with parts broken away showing a system incorporated into a portable water sanitizing unit adapted for use in dental systems.
Figure 4:
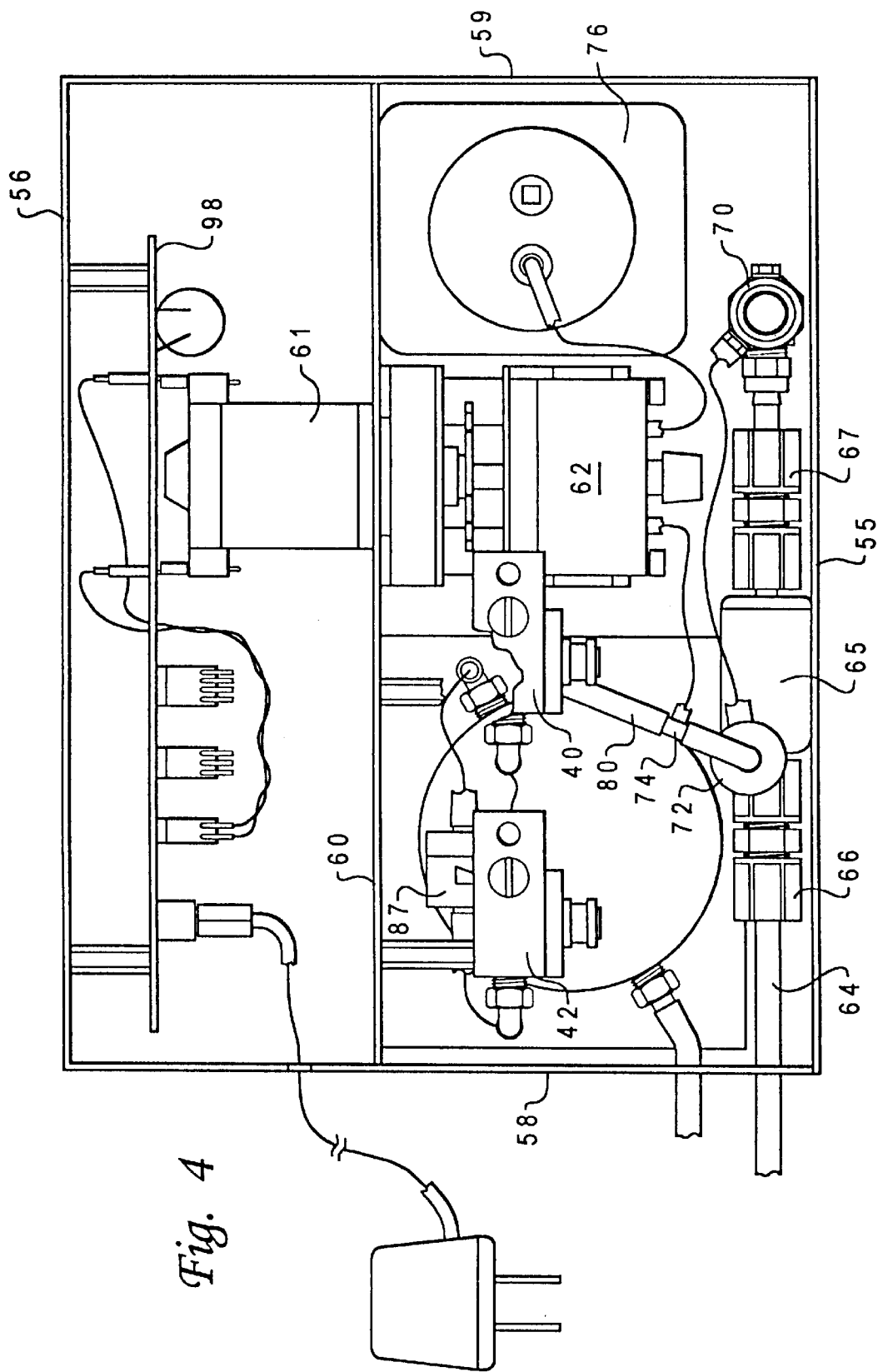
FIG. 4 is a plane view of the system shown in FIG. 3.

FIGS. 3 and 4 illustrate a water sanitizing unit adapted for use with dental units and the like. FIG. 3 is a side elevation with parts broken away of the sanitizing unit; FIG. 4 is a top view of the system shown in FIG. 3. Turning first to FIG. 3, there is illustrated a side elevation with parts broken away of a water sanitizing unit adapted for use with dental units and the like. More particularly and as shown in FIGS. 3 and 4, the sanitizing unit is mounted within a container 54, having front and back walls 55 and 56 and side walls 58 and 59. A transverse intermediate partition 60 extends between the side walls and provides a mounting surface for a peristaltic pump 62 and its drive motor 61 and a pair of variable speed incremental flow switches 40 and 42.

As further shown in FIG. 3, a water inlet line 64 of clear polyurethane tubing extends through an in-line 25-micron water filter 65 held in place by in-line compression fittings 66 and 67, respectively. Arrows (→) are used for line 64 and various other conduits shown in FIG. 3 to indicate flow direction. The output line from the compression unit 67 is applied to a brass elbow fitting 68 which leads into the bottom of a pressure-reducing valve 70. Valve 70 reduces the water line pressure to a suitable value, e.g. 18 pounds per square inch. The outlet line from valve 70 passes to an in-line polypropylene check valve 72 which has a one-half psi cracking pressure. This valve is provided with buna-N rubber seals and a 316 grade stainless steel spring so that it is not subject to corrosive action by the citric acid or other GRAS acid. The output line from the check valve 72 extends into a ⅛-inch tubing "T" 74 provided with a side line having an ID of 1/16 inch. This, of course, provides a mixing junction for a water solution of bactericide supplied from a reservoir 76 via peristaltic pump 62. The output line 80 from the mixing junction 74 extends to an elbow 81 at the bottom of the first flow switch 40. The output from flow switch 40 is applied through an exit elbow and an interconnecting flow line 82 through elbow 84 to the bottom of the second flow switch 42. The output of flow switch 42 is applied through an exit elbow and PVC flow line 86 to a one-way check valve 87, again having a crack pressure of ½ psi, to the bottom of a mixing chamber 89, which preferably has a capacity within the range of 50–250 ml. Mixing chamber 89 preferably takes the form of a dome-shaped tank having a flat bottom and a capacity of about 125 cc.

The reservoir 76 for the acidifier may take the form of a one-liter polypropylene bottle which is removably contained within the enclosure 54. The bottle 76 is closed with an airtight cap 91 which serves as a mount for a collection tube 92 running to the bottom of the bottle from a bulkhead nipple 93 and an air filter 94. The filter 94 may take the form of a 0.2 micro hydrophobic syringe filter which provides for venting of the reservoir 76 as bactericide is withdrawn. The filter could be of a 0.45 micron configuration or larger as long as it is hydrophobic in nature. The output end of the collector tube is connected to a 1/32-inch I.D. Norprene (Norton) tubing which runs to the inlet side of the peristaltic pump 62 and vents from the outlet side of the pump to the inlet of the mixing junction, "T" 74.

The pump motor and the switch outlets are connected to a controller 98 board which incorporates an integral motor control unit and microprocessor mounted on the back wall 56 of the container 54. Power may be supplied to the controller by a wall mounted step-down transformer having a 12-volt AC output which can then be rectified to DC voltage in the controller board.

With the exception of the reservoir 76, which is removable, the other components of the system are firmly mounted within the container 54 to provide an integral unit. The reservoir can be removed in order to readily replenish the bactericide when the supply has been exhausted and to ensure the bactericide does not spill on essential components.

As noted previously, gram-negative bacteria are the most common source of slime layer buildup within water supply lines leading to dental units and the like. The most commonly encountered bacteria are Pseudomonas species. Citric acid is effective no only as an acidifier to enhance the formation of hypochlorous acid in chlorinated water but also as a bactericide because of its chelating effect. Acids which can also chelate metal ions are preferred acids because of their dual mode of action. The effectiveness of citric acid as a biocide for water-originated biofilms has been tested and established by the following experimental work. *Pseudomonas aeruginosa* was chosen for the experimental work due to its high prevalence and high resistance and the fact that it produces one of the heaviest biofilms. The test used a 24-hour culture of *Pseudomonas euroginosa* (ATCC 9027) grown in tryptic soy broth which was inoculated into 100 milliliter polyvinylchloride bottles containing 50 milliliters of sterile water U.S.P. (Baxter). The inoculum was determined to produce a concentration of $1.88 \times 10^6$ per milliliter of *Pseudomonas euroginosa* per bottle. These bottles were stored at room temperature and agitated every 12 hours. After 10 weeks a mature biofilm should have been produced. Twelve bottles were utilized for this aspect of the study. Three were control bottles, and these had their volumes replaced with sterile water U.S.P. (Baxter). The next three bottles were designated "A," and their volume was replaced with a solution of citric acid in tap water at a concentration of 0.14 wt. %. The third group of three bottles was designated "B," and their volume was replaced with a tap water/citric acid concentration of 0.117 wt. %. The fourth group of three bottles was designated "C," and their volume was replaced with a tap water/citric acid concentration of 0.117 wt. %, plus 0.7 grams of Sweet-n-Low saccharine sweetener was added to a concentration of 0.0084 wt. % calcium saccharin. The saccharin was added to make the water/citric acid mixture more palatable. The tap water had an approximate hardness of 134 ppm $CaCO_3$.

The three control bottles had about 20,000,000 CFU per milliliter for each of the bottles at this 10-week time frame. All twelve bottles were tested at 1 day, 3 days, and 7 days. At days 1, 3, and 7 all the treated bottles showed no growth. The three control bottles showed an immediate growth, presumably from their biofilm, of 270,000–430,000 CFU per milliliter on day one, 410,000–510,000 CFU per milliliter on day three, and 270,000–490,000 CFU per milliliter on day seven.

At the end of the seven days, all the bottles containing the citric acid mixture were emptied completely and filled with 10% tryptic soy growth broth in sterile water U.S.P. These were allowed to incubate at 37° C. for 48 hours and then were removed from the incubator and incubated an additional 5 days at room temperature. After 7 days, samples were taken from each of the bottles and plated on tryptic soy broth with lecithin and tween. No growth was seen. This experimental work showed:

(1) The presumed presence of a viable biofilm,
(2) The rapid inactivation of the biofilm using a very dilute citric acid solution in a very short period of time,
(3) The total destruction of biofilm at the end of 7 days, and
(4) That addition of calcium saccharin had no detrimental effects of the citric acid's effectiveness.

Another separate study was performed to determine the rate and size of reduction of pathogenic bacteria that two different citric acid concentrations were able to accomplish. The three bacteria chosen have all been observed in dental unit waterlines and are all ATCC so they are assured of purity. Two are of human origin and one of water origin.

Two citric acid/tap water concentrations were prepared. The tap water had an approximate hardness of 134 ppm of $CaCO_3$. Sample "A" contained a 0.467 wt. % concentration of citric acid and sample "B" had a citric acid concentration of 0.233 wt. %. Both of these samples contained 0.24% calcium saccharin. Into sterile test tubes containing either of these samples were placed either *Escherichia coli* in a concentration of 160,000,000 CFU per milliliter, *Staphylococcus aureus* in a concentration of 190,000,000 CFU per milliliter, and *Pseudomonas euroginosa* in a concentration of 140,000,000 CFU per milliliter. These samples were tested at 10 minutes, 30 minutes, 60 minutes, and 24 hours.

For the *Escherichia coli*, sample A showed a complete kill at 10 minutes. For sample B, a reduction down to 6 CFU per milliliter was seen at 30 minutes. It took more than 60 minutes but less than 24 hours to completely eliminate the *E. coli* with sample B.

For the *Staphylococcus aureus*, sample A showed a complete kill at 30 minutes. For sample B, a reduction down to 2,000 CFU per milliliter was seen at 60 minutes and a complete kill was seen at 24 hours. For the *Pseudomonas euroginosa*, sample A and sample B showed a complete kill at 10 minutes.

Further experimental work illustrating the interrelationship between chlorine content, water hardness, and time to achieve a reduction in colony-forming units or complete kill of bacteria was carried out with two GRAS-status acidifiers: one a hydroxy carboxylic acid, citric acid, as described above; and the other, an inorganic acid, hydrochloric acid. In this experimental work, kill levels for the previously described bacteria, *Escherichia coli, Staphlococcus aureus*, and *Pseudomonas euroginosa* were established along with the bacterium *Klebsiella pneumonia*. In addition, work was carried out with one yeast, *Candida albicans*, under conditions similar for those used for the bacteria. The water used in the experimental work was water from a municipal water source which was artificially hardened to. produce a water hardness level of 400 ppm $CaCO_3$. This hardened water had a total chlorine and free chlorine content of about 2.4 ppm and 0.9 ppm, respectively. A second water sample was prepared by mixing this chlorinated hardened water equally with distilled water which had been previously hardened to 400 ppm $CaCO_3$. The third water sample employed in this experimental work was artificially hardened distilled water. This was tap water which was distilled to eliminate the chlorine content and then artificially hardened to a hardness level of 400 ppm $CaCO_3$.

In one set of experiments, the four bacteria, *Escherichia coli* ATCC 8739, *Staphylococcus aureus* ATCC 6538, *Pseudomonas euroginosa* ATCC 9027, and *Klebsiella pneumonia* ATCC 13883, and the yeast, *Candida albicans* ATCC 10231, were inoculated into individual test tubes containing 9.0 milliliters (ml) of tryptic soy broth (TSB) and incubated at 37° C. for 24 hours. Approximately 0.1 ml of each bacteria and 0.3 ml of the Candida were then inoculated into 9.0 ml of TSB which served as the stock solution (inoculum suspension).

Solutions of citric acid and hydrochloric acid were prepared as follows: A 4000 ml Ertylmeyer flask was filled with 1800 ml of tap water from a Dallas, Tex., municipal water supply. One hundred milliliters were decanted out for chemical analysis of the chlorine content. The remaining 1700 ml were hardened and basified to a relative hardness level of 400 parts per million (ppm) of $CaCO_3$ using a modification of the Association of Official Analytical Chemists (AOAC) Official Methods of Analysis for producing synthetic hard water. This modification assumed that the water at the time had a $CaCO_3$ level of 134 ppm, which is about the average for Dallas municipal water. Another, 100 ml of this hardened tap water was decanted out for chemical analysis of chlorine content. A second 4000 ml Ertylmeyer flask was filled with 1600 ml of distilled water. This water was then hardened and basified to an approximate level of 400 ppm $CaCO_3$ using the AOAC Official Methods of Analysis procedure for producing synthetic hard water. Six 500 ml Ertylmeyer flasks were prepared with 2 containing 500 ml of the previously prepared hardened tap water. The second two flasks were each filled with 250 ml of the hardened tap water and 250 ml of hardened distilled water. The last two flasks were each filled with 500 ml of hardened distilled water. To one flask from each of the three different water mixtures was added 1.05 gm of Citric Acid U.S.P. to provide a citric acid concentration of 0.21 %. The water in these three citric acid (CA) flasks then had their pH determined. To the other matching three water mixtures were added a quantity of HCl to reach a matching pH of the corresponding CA water mixtures. To each of these 6 water samples were added 3 grams of Sweet-N-Low, a dextrose/calcium saccharin sweetener.

Thirty-five sterile specimen cups were divided into seven groups of five. To six of the seven groups of five were added 99 ml of one of the six previously prepared citric acid (CA) or HCl water mixtures. In the last group of five, 99 ml of distilled water was added to each to act as the control. The stock cultures of the five microorganisms being tested were serially diluted and plated to determine the inoculum level. To each of the five specimen cups in each of the seven groups was added 1 ml of one of the five stock cultures so that each specimen cup in each group held a different microorganism. In this time kill experiment, sampling was done at 10 minutes, 1 hours, 2 hours, 4 hours and 24 hours for the hardened tap water citric acid (HTWCA), the hardened tap water HCl (HTWHCl), the ½ hardened tap water/½ hardened distilled water CA (½ HT/½ HDCA), and the ½ hardened tap water/½ hardened distilled water HCl (½ HT/½ DHCl). The hardened distilled water CA (HDCA) and the hardened distilled HCl (HDHCl) were sampled at 4 hours and 24 hours. The control was sampled at 24 hours. This experiment was repeated.

The final testing concentrations for the bacteria and yeast were all $1 \times 10^7$ colony forming units (cfu)/ml or above. The final pH of the three different citric acid solutions and the three different hydrochloric solutions was 2.86 +/−0.01 for the hardened distilled water solutions. The total chlorine and the free chlorine in the tap water were 2.4 ppm and 0.9 ppm respectively.

The results of this experimental work are summarized below in Tables 1 and 2. In each of Tables 1 and 2 the results of the four bacteria, *Escherichia coli* (I), *Staphylococcus aureus* (II), *Pseudomonas euroginosa* (III), and *Klebsiella pneumonia* (IV), are illustrated in the vertical columns for the three water systems having hardness and relative chlorine content as indicated. Table 1 shows the time necessary to achieve a 5-log reduction ($10^{-5}$) in colony-forming units per milliliter for each of the bacteria cultures in the various water systems involved. Table 2 shows the time necessary to achieve a complete kill for the bacteria in the water systems involved.

TABLE 1

| HARD- | FREE | | TIME BACTERIA | | | |
|---|---|---|---|---|---|---|
| NESS | CHOLINE | ACID | I | II | III | IV |
| 400 | .9 | CA | 10 min | 2 hrs | 10 min | 10 min |
| 400 | .9 | HCl | 60 min | 2 hrs | 10 min | 10 min |
| 400 | .45 | CA | 60 min | 4 hrs | 10 min | 10 min |
| 400 | .45 | HCl | 4 hrs | 4 hrs | 10 min | 60 min |
| 400 | 0 | CA | 4 hrs | 4 hrs | 10 min | <4 hrs |
| 400 | 0 | HCl | 24 hrs | 24 hrs | <4 hrs | 24 hrs |

TABLE 2

| HARD- | FREE | | TIME BACTERIA | | | |
|---|---|---|---|---|---|---|
| NESS | CHOLINE | ACID | I | II | III | IV |
| 400 | .9 | CA | 1 hr | 4 hrs | 10 min | 10 min |
| 400 | .9 | HCl | 4 hrs | 2 hrs | 10 min | 60 min |
| 400 | .45 | CA | 1 hr | 4 hrs | 10 min | 10 min |
| 400 | .45 | HCl | 24 hrs | 24 hrs | 10 min | 60 min |
| 400 | 0 | CA | 24 hrs | 4 hrs | 10 min | <4 hrs |
| 400 | 0 | HCl | 24 hrs | 24 hrs | <4 hrs | 24 hrs |

The experimental work presented in Tables 1 and 2 show that when comparing the four bacteria against the two acids, there was a significant increase in the kill rates with the citric acid versus the hydrochloric acid, with few exceptions. These exceptions dealt with the 10 minute kill of all but the HDHCl treated *P. aeruginosa*. The kill rate was also linked to the percentage of tap water, and thus the quantity of free chlorine mixed with the respective acids, where a lower percentage of tap water versus distilled water, significantly decreased the kill rate. Although this was seen with both the organic and inorganic acids, the citric acid showed its superiority as the tap water percentage decreased. The superior kill rates with citric acid were linked with the ability of citric acids chelate metal ions which will cause a rapid disruption of the gram negative bacteria's cell wall.

There were variations seen with the kill rate of *E. coli* and *K. pneumonia*. The *E. coli* in the HTWCHl took 24 hours for both a 5 log reduction as well as a complete kill (the ½ HT/½ HDCA and the ½ HT/½ HDHCl was not done until 24 hours). The *K. pneumonia*, when placed in HDHCl, had a 4 log reduction in 24 hours and took 48 hours for a complete kill.

Further experimental work was conducted using a deionized water source which was found to be contaminated with two separate species of wild type Pseudomonas (API Typed) at a level of 2000 cfu/ml. Ten ml of this deionized water was pipetted into 13 new non-sterile PVC bottles containing 29 ml of sterile water U.S.P. (Baxter) and 1 ml of tryptic soy broth to produce a final concentration of 500 cfu/ml. These bottles were stored in a dark cabinet for 80 days at 24° C.+/−2 to produce a biofilm. Twice daily, these bottles were swirled vigorously to emulate water flow.

After the 80-day storage period, three bottles were sampled for serial aerobic plate counts. Synthetic hard tap water was produced in the same manner as described above using a modified AOAC method. The water was presumed to have an initial relative hardness of 134 ppm $CaCO_3$ and was hardened to a final hardness of approximately 400 ppm $CaCO_3$. To 500 ml of this hardened water was added 1 gm of Citric Acid U.S.P. to produce a 0.20%. citric acid solution and 3 grams of Sweet-N-Low, a dextrose/calcium saccharin sweetener, which produced a final pH of 2.84. To the other 300 ml of the synthetic hard tap water was added enough 1N HCl to produce a final pH of 2.86. Two grams of Sweet-N-Low dextrose/calcium saccharin sweetener were also added to this HCl solution. All 13 of the test bottles were then emptied and rinsed with 25 ml of sterile water, U.S.P. and then completely emptied. Three bottles were kept as controls and filled with 60 ml of sterile water, U.S.P. To 7 of the bottles was added 60 ml of the hardened tap water CA (HTWCA) and to the last 3 bottles was added 60 ml of the hardened tap water HCl (HTWHCl). The bottles were held at 24° C.+/−2 and aliquots were drawn from each on days 1, 5, and 7 for aerobic plate counts. On day 7, one bottle from the control group, the HTWCA group, and the HTWHCl group were submitted for SEM analysis. At that time, the remaining 8 treated bottles and the 2 remaining control bottles were emptied and filled with 10% TSB in sterile water for a total of 99 ml each. The inner surface of these bottles was scraped with a sterile sharpened spatula to dislodge any bacteria which may have survived in the deeper layers of the presumed biofilm. These 8 bottles were incubated for 48 hours at 37° C. and then for 5 more days at 25° C.+/−2. At the end of this 7-day period of incubation, aerobic plate counts were performed. This experiment was repeated using ATCC *Pseudomonas euroginosa*.

Sampling of each of the HTWCA treated bottles and the HTWHCl treated bottles showed no regrowth of Pseudomonas on any day tested. The 3 control bottles showed an immediate regrowth which was sustained in all three bottles between a level of $1.9 \times 10^5$ cfu/ml and $2.7 \times 10^5$ cfu/ml through day 7. After 7 more days of being incubated with 10% TSB, there was still no regrowth in any of the 8 remaining acid treated bottles. The two remaining control bottles showed a regrowth between a level of $1.5 \times 10^5$ cfu/ml and $2.2 \times 10^5$ cfu/ml.

In the SEM study, the control bottle demonstrated light bacterial growth across the entire field at 100× magnification. At 800× magnification, bacilli were clearly identifiable. On the HCTWCA and the HTWHCl bottle specimens, no bacilli could be identified. At 800× magnification, only pinpoint remnants of the Pseudomonas were identifiable.

In further experimental work the system of FIGS. 3 and 4 was used as a microprocessor-controlled citric acid injection system placed inline between a municipal water supply and the dental unit. This system injected citric acid into the municipal water supply at a concentration range of 0.1 to 0.3 wt. %. Six centimeter-long segments from the new tubing from both the treated dental unit tubing as well as the control dental unit tubing were taken at one week and one month, and were sent for SEM evaluation. One of the two dental units had a technical difficulty (a line rupture and flood) which only allowed a one week SEM analysis on that unit.

In the results from the dental unit waterline connected inline between the handpiece block and the handpiece tubing, an obvious biofilm was visible on the control sample at 800× magnification. At the same magnification, the 1-month treated segment showed no appreciable biofilm. At a magnification of 2000×, a moderate amount of bacterial growth was seen on the control tubing segment. At the 2000× magnification of the 1-month treated tubing segment, there were very few actual bacteria discernible. However, there was a moderate amount of amorphous deposits seen across the field. At a magnification of 7000×, the amorphous masses looked like bacteria with their cell walls ruptured.

In the SEM results from the dental unit waterline connected inline 7 feet prior to the air/water syringe, the 1-week control tubing segment showed moderate bacterial growth at 800× magnification. In the 1-week treated segment at 800× magnification, almost no bacteria were discernible. However, there was an even distribution of the same type of amorphous deposits which appeared to have been previously ruptured bacteria.

The effectiveness of the present invention can be considered in light of standards recognized by the U.S. Food and Drug Administration (FDA) for delineating sterile conditions. The FDA recognizes a 6 log ($10^6$) reduction of bacteria as a confirmation for reaching sterility. Against this background, it can be seen that the foregoing experimental work establishes that a larger reduction of bacteria can be achieved at low concentrations of citric acid standardly delivered by the water sanitizing system of the present invention during typical dental operations, such as drilling and utilization of an ultrasonic scaler. At least a 7 log reduction for *E-coli* and *Pseudomonas euroginosa* was observed at ten minutes with concentrations of citric acid as described above with reference to samples "A" and "B." A 6 log reduction of *Staphylococcus aureus* was established at the 0.467 wt. % concentration at 30 minutes while a 5 log reduction was observed at the lower concentration (0.233 wt. %) at 60 minutes. A complete kill of all test bacteria was confirmed at 24 hours. In view of the 9 log reduction of both gram positive and gram negative bacteria at 24 hours, the potential for newly-introduced bacteria to produce a biofilm would appear to be very remote. In addition, the presence of dextrose and saccharin, specifically calcium saccharin in the citric acid solution did not appear to adversely affect the function of the bactericide.

As indicated by the foregoing experimental work, an acid need be supplied in only relatively low concentrations in order to be effective in the formation of hypochlorous acid leading to the elimination of the formation of biofilm in the dental unit and the associated water supply lines and utilization devices. For the preferred low molecular weight hydroxycarboxylic acids employed in the present invention, a concentration of 0.1 wt. % is sufficient so long as the acidifier is supplied in a concurrent fashion in accordance with the present invention and there is little water hardness. Thus, the acidifier concentration, as employed in the dental unit and the associated water supply lines, is preferably within the range of $0.1 \geq 1.0$ wt. %. While greater amounts can be used, they are unnecessary and may offer objectionable bitterness to the patient. A citric acid concentration of at least 0.2 wt. % is preferred in hard water. As a practical matter, during the majority of dental procedures, the concentration will be within the range of about 0.2 to about 0.8 wt. %. This range can be dictated by the ratio of the pump speed to the delivered water flow rate relative to each of the flow switches'activation points,. or can be mixed daily at a range between 0.1 and 1.0 wt. %. Other acids can automatically be supplied or manually mixed to a pH below 4, or with the ideal pH level, using very hard water, of 2.8–2.9. This concentration range is targeted because it offers both the ability to destroy bacterial biofilms as well as the ability to rapidly destroy newly introduced bacteria, and it can do this at very palatable concentrations. As discussed above, the water supply rates can vary widely from one dental instrument to another. The large mixing chamber allows higher and lower concentrations to be mixed so that these concentrations can be averaged. This mixing chamber also acts as a treatment holding tank so that the acid may act upon the newly treated water prior to delivery. As a practical matter, the concentration of citric acid or another acid usually will require a pH of 2.8–2.9 or below when extremely hard water with substantial alkaline earth metal compounds such as calcium and magnesium chlorides and carbonates are encountered. With citric acid the more preferred concentration will be within the range of about 0.2 to about 0.5 wt. % during most of a cycle of operation. As noted previously, the water supply rates can vary widely depending upon the particular dental instrument used and low concentrations outside of the aforementioned ranges can be tolerated especially at low flow rates as long as there is some compensation provided by concentrations within the desired range. For example, if it is desirable, giving considerations of water hardness and the like to maintain an acidifier concentration attaining a pH of 2.8–2.9, intermittent concentration above this value can be tolerated so long as overall the pH is approximately 2.8–2.9. An important consideration in this invention is that so long as the acidifier is supplied to the dental unit water in a concurrent fashion, i.e., continuously or nearly continuously with only small interruptions, biofilm formation will be largely prevented and any biofilm that does form, e.g., because of inactivity of the system, will be effectively eliminated.

An alternative mode of operation which does not have the equipment demands of the above-described procedure involves a semi-automatic operation which can readily be accomplished in a dental office or like facility. While simpler in its implementation, the considerations described above with respect to the acidifier, pH, chlorine content and water hardness as considered previously, apply here also. In this aspect of the invention, an in-line, water pressure-driven, independent reservoir bottle can be connected to the dental unit or can be supplied by a dental unit manufacturer, as is know in the art. The 0.5–2 liter plastic reservoir bottle can be filled with tap water in the dentist's office at the start of the daily regimen. A physiologically safe acidifier of the type described previously is then added in amounts sufficient to bring the pH to a value of 4 or less, or more preferably down to 3.1 or less, or about 2.8–2.9 depending upon the hardness of the water. As a practical matter, a prescribed quantity of a concentrated solution of citric acids such as 15 wt. % citric acid solution can be added to the bottle of water to provide a citric acid concentration of at least 0.1 wt. % and typically about 0.2–0.8 wt. %. As described previously, this would provide sufficient acid content to maintain the pH in the desired range of 2.8–2.9 to accommodate substantial water hardness of perhaps 400–20 500 ppm or even more. This treatment water bottle is an air pressure-drive, in-line system known in the art. In this application, it offers the dentist a semi-automatic method to deliver the acidified biofilm treatment water through the dental water lines in a similar fashion as the aforementioned automatic system.

Once the acidifier is added to the chlorinated tap water, the equilibrium relationship between the hypochlorous acid and the hypochlorite ion will be, of course, shifted heavily in favor of hypochlorous acid. As the hypochlorous acid is formed, it is subject to decomposition in the presence of light energy and vaporization of chlorine and, thus, has a shortened effective life of 24 hours and more ideally 8 hours.

Having described specific embodiments of the present invention, it will be understood that modifications thereof may be suggested to those skilled in the art, and it is intended to cover all such modifications as fall within the scope of the appended claims.

What is claimed:

1. In a method for providing a sanitized aqueous medium for a water delivery system to a dental patient, the steps comprising:
    (a) providing a dental unit for use in dental treatment;
    (b) delivering a stream of water to said dental unit from a source of potable water containing hypochlorous acid and hypochlorite and free chlorine in an amount of about 0.1 ppm or more;
    (c) providing a physiologically safe acidifier selected from the group consisting of inorganic acids, organic acids, and acid esters; and
    (d) incorporating said acidifier into the water delivered to said water delivery system in an amount to reduce the pH of the water delivered to the water delivery system to a value of about 3.2 or less to provide a substantially enhanced hypochlorous acid content sufficient to elixiate the viability of a mature biofilm produced by the bacteria Pseudomonas euroginosa.

2. The method of claim 1 wherein said acidifier is incorporated into said water stream in an amount to provide a ratio of hypochlorous acid to hypochlorite ion of at least 50:1.

3. The method of claim 1 wherein said acidifier is selected from the group consisting of acetic acid, lactic acid, benzoic acid, parahydroxybenzoic acid, methyl, ethyl, propyl esters, of parahydroxy benzoic acid, ascorbic acid, isoascorbic acid, citric acid, sorbic acid, formic acid, phosphoric acid, hydrochloric acid, boric acid, maleic acid, tartaric acid, succinic acid, and glutaric acid.

4. The method of claim 1 wherein said water has a hardness within the range of 50–500 ppm measured as calcium carbonate.

5. The method of claim 4 wherein said acidifier is incorporated into said water in an amount to reduce the pH to a value of about 3.1 or less.

6. The method of claim 4 wherein said acidifier is incorporated into said water in an amount to reduce the pH to a value of 2.8–2.9 or less.

7. The method of claim 1 wherein the flow rate of water delivered to said dental unit is varied and further comprising the steps of sensing the flow rate of said water as it is supplied to said dental unit and adjusting the rate of which said acidifier is incorporated into said water in response to said sensed flow rate.

8. In a method for providing a sanitized aqueous medium for a water delivery system to a dental patient in dental treament, the steps comprising:
    (a) providing an in-line, air pressure-driven dental water reservoir bottle supply system;
    (b) supplying a quanity of water containing hypochlorous acid and hypochlorite and free chloring in an amount of at least 0.1 ppm to said reservoir;
    (c) incorporating a phsiologically safe acidifier selected from the group consisting of inorganic acids, oranic acids, and acid esters into the water within said reservoir in an amount sufficient to reduce the pH of the water within said reservoir to provide a value of about 3.2 or less to provide a substantially-enhanced hypochlorous acid content sufficient to eliminate the viability of a mature biofilm produced by the bacteria Pseudomanas aeruginosa; and
    (d) within a period of 24 hours subsequent to step (c), applying water from said reservoir in a dental treatment.

9. The method of claim 8 further comprising the step subsequent to step (d), removing stale water from said reservoir and thereafter repeating steps (a), (b), and (c).

10. The method of claim 8 wherein water is applied from said reservoir in a dental treatment within a period of 16 hours subsequent to step (c).

11. The method of claim 8 wherein said acidifier is selected from the group consisting of acetic acid, lactic acid, benzoic acid, parahydroxybenzoic acid, methyl, ethyl, propyl esters, of parahydroxy benzoic acid, ascorbic acid, isoascorbic acid, citric acid, sorbic acid, formic acid, phosphoric acid, hydrochloric acid, boric acid, maleic acid, tartaric acid, succinic acid, and glutaric acid.

12. The method of claim 8 wherein said acidifier comprises citric acid.

13. The method of claim 8 wherein said acidifier is incorporated into said water in an amount to reduce the pH to a value of about 3.1 or less.

14. The method of claim 8 wherein said water has a hardness within the range of 50–500 ppm measured as calcium carbonate.

15. The method of claim 14 wherein said water has a hardness of at least about 100ppm measured as calcium carbonate.

16. The method of claim 15 wherein said acidifier is incorporated into said water in an amount to reduce the pH to a value of 2.8–2.9 or less.

17. In a method for providing a sanitized aqueous medium to a dental unit, the steps comprising:
    (a) providing a dental unit for use in dental treatment;
    (b) delivering a stream of water to said dental unit from a source of potable water containing free chlorine in an amount of about 0.1 ppm or more;
    (c) providing a physiologically safe acidifier comprising citric acid; and
    (d) incorporating said acidifier into the water delivered to said dental unit in an amount to reduce the pH of the water delivered to the dental unit to a value of about 4 or less to provide a substantially enhanced hypochlorous acid content sufficient to eliminate the viability of a mature biofilm produced by the bacteria Pseudomonas euroginosa.

18. The method of claim 17 wherein said water has a hardness within the range of 50–500 ppm measured as calcium carbonate.

19. In a method for providing a sanitized aqueous medium for use in dental treatment, the steps comprising:
    (a) providing an in-line, air pressure-driven dental water reservoir bottle supply system;
    (b) supplying a quantity of water containing free chlorine in an amount of at least 0.1 ppm to said reservoir;
    (c) incorporating a physiologically safe acidifier comprising citric acid into the water within said reservoir in an amount sufficient to reduce the pH of the water within said reservoir to provide a value of about 4 or less to provide a substantially-enhanced hypochlorous acid content sufficient to eliminate the viability of a mature biofilm produced by the bacteria Pseudomonas qeruginosa; and
    (d) within a period of 24 hours subsequent to step (c), applying water from said reservoir in a dental treatment.

20. The method of claim 19 wherein said water has a hardness within the range of 50–500 ppm measured as calcium carbonate.

* * * * *

UNITED STATES PATENT AND TRADEMARK OFFICE
CERTIFICATE OF CORRECTION

PATENT NO : 6,019,905
DATED : February 1, 2000
INVENTOR(S): Mark B. Waggoner

It is certified that error appears in the above-identified patent and that said Letters Patent is hereby corrected as shown below:

Column 14, line 32, change "euroginosa" to --aeruginosa--;

Column 14, line 37, change "euroginosa" to --aeruginosa--;

Column 15, line 28, change "euroginosa" to --aeruginosa--;

Column 15, line 40, change "euroginosa" to --aeruginosa--;

Column 15, line 50, change "euroginosa" to --aeruginosa--;

Column 16, line 1, change "euroginosa" to --aeruginosa--;

Column 17, line 4, change "euroginosa" to --aeruginosa--;

Column 18, line 37, change "euroginosa" to --aeruginosa--;

Column 19, line 29, change "euroginosa" to --aeruginosa--;

Column 21, lines 21-22, change "elixiate" to --eliminate--;

Column 21, line 23, change "*euroginosa* to --*aeruginosa*--;

Column 21, line 54, change "chloring" to --chlorine--;

Column 21, line 56, change "phsiologically" to --physiologically--;

UNITED STATES PATENT AND TRADEMARK OFFICE
CERTIFICATE OF CORRECTION

PATENT NO : 6,019,905
DATED : February 1, 2000
INVENTOR(S) : Mark B. Waggoner

It is certified that error appears in the above-identified patent and that said Letters Patent is hereby corrected as shown below:

Column 21, line 57, change "oranic" to --organic--;

Column 22, line 42, change "*euroginosa*" to --*aeruginosa*--;

Column 22, lines 58-59, change "*qeruginosa*" to --*aeruginosa*--"

Signed and Sealed this

Twenty-second Day of May, 2001

Attest:

NICHOLAS P. GODICI

Attesting Officer      Acting Director of the United States Patent and Trademark Office